3,577,351
**METHOD FOR THE RECOVERY OF
RARE EARTH OXIDES**
Robert E. Dodds, Wysox, Pa., assignor to
Sylvania Electric Products Inc.
No Drawing. Filed Jan. 30, 1969, Ser. No. 795,346
Int. Cl. C09k 1/10
U.S. Cl. 252—301.4      10 Claims

ABSTRACT OF THE DISCLOSURE

A process is disclosed that is suitable for recovering rare earth oxide phosphors from an impure material containing rare earth oxides contaminated with other phosphors used in color television cathode ray tubes. The process comprises: heating the impure material to remove volatile material, forming an aqueous material containing the impure rare earth material, adjusting the temperature of the mixture to about 80° C., maintaining the pH of the mixture at from about 3 to about 5 to dissolve the rare earth oxides, separating the solids from the mixture to form a liquid phase containing the rare earth values and precipitating the rare earth values and converting said rare earth values to rare earth oxide phosphors.

BACKGROUND OF THE INVENTION

This invention relates to the production of rare earth oxide phosphors. More particularly it is related to the recovery of rare earth oxide phosphors in a relatively pure form from phosphor compositions that are contaminated with other phosphors.

In the manufacture of color television cathode ray tubes, a three component phosphor system is used. The three phosphors are red, green and blue emitting phosphors. Red-emitting phosphors that have been found to emit bright red colors are the europium-activated rare earth phosphors. Examples of these red-emitting phosphors previously used are europium-activated yttrium orthovanadates and yttrium oxysulfides. The blue phosphor is generally zinc sulfide and the green phosphor is generally zinc-cadmium sulfide. The europium-activated rare earth oxides such as yttrium oxide, gadolinium oxide and mixed yttrium-gadolinium oxide phosphors are highly efficient red phosphors. One of the problems associated with the use of the phosphors that has prevented wide acceptance of these phosphors, even though in general they are brighter than the currently used red phosphors, is the difficulty in recovering the rare earth oxide phosphors from compositions that contain the rare earth oxides and are contaminated with other phosphors such as the traditional blue and green phosphors, the presently used red phosphors and mixtures of the above. As can be appreciated, not all color cathode ray tubes meet manufacturing specifications, and in salvaging the relatively expensive rare earth values, the oxides generally become contaminated with not only the blue and green phosphors but also can be contaminated with the other red phosphors that are currently in use, such as yttrium orthovanadate and yttrium oxysulfide.

When the methods heretofore known for salvaging phosphors are used for recovering the rare earth oxides, such as the caustic washing method, the resulting materials are too dull for most applications.

It is believed, therefore, that a method that will recover rare earth oxide phosphors having a brightness at least equal to virgin rare earth oxide phosphor, from materials that can contain the rare earth oxides and other phosphors, is an advancement in the art.

SUMMARY OF THE INVENTION

In accordance with one aspect of this invention, there is provided a process for recovering rare earth oxide phosphors from impure compositions that can contain, in addition to the rare earth oxides, the other phosphors normally used in color television cathode ray tubes. The process of this invention comprises (a) heating the impure compositions to at least about 1000° F., (b) forming an aqueous mixture comprising from about 1% to 25% by weight of said impure composition, (c) adjusting the temperature of said mixture to at least about 80° C., (d) maintaining the pH of said mixture from about 3 to about 5 for a time sufficient to complete the dissolution of said rare earth oxides, (e) separating any solids from the resulting medium to thereby form a liquid phase, (f) precipitating the rare earth values from said liquid phase as water-insoluble thermally oxidizable rare earth salts, (g) recovering the rare earth salts and (h) converting the rare earth salts to rare earth oxide phosphors that have at least essentially the same phosphor characteristics as virgin rare earth oxide phosphors.

For a better understanding of the present invention, together with other and further objects, advantages and capabilities thereof, reference is made to the following disclosure and appended claims in connection with the above description of some of the aspects of the present invention.

DESCRIPTION OF THE PREFERRED EMBODIMENTS

Impure rare earth oxide-containing material that is contaminated with other phosphors, can be processed by the practice of the invention and the resulting material has a degree of brightness that is acceptable as a red-emitting phosphor in a color television picture tube. It is to be noted that within the context of the present invention, yttrium is considered as a rare earth because it behaves similarly to other rare earths of the lanthanide series. It is also to be noted that in many instances the exact composition of the impure materials will not be known without extensive analytical tests, therefore, it is an advantage to have a process that will be operative regardless of the contaminants.

Since the phosphor materials can be contaminated with a variety of materials, the first step in reclaimiing the materials is to heat the material to at least about 1000° F. to remove the volatile organic contaminants such as polymers, photoresists and the like. Temperatures above about 1000° F. can be used, however, higher temperatures will not appreciably aid in recovering the rare earth oxide, and in some instances, temperatures much above about 1200° F. can cause deleterious effects. Use of temperatures substantially below about 1000° F. will not remove some of the contaminants that can be present. It is, therefore, preferred to use a temperature of about 1000° F. to about 1100° F. to insure that the most efficient recovery process is achieved.

After the material has been heated to at least about 1000° F. the resulting powder is slurried in water to form an aqueous mixture, comprising from about 1% to about 25% by weight of solids that are derived from the heated impure materials. As used herein, solids refers to all of the impure material whether dissolved in water or suspended in the water as a slurry or a suspension. If higher levels of solids are used, the viscosity of the mixture can be too high to be handled by conventional equipmtnt such as pumps, agitators and the like since the oxide phosphors tend to form a gel-like material. Lower levels of solids in the aqueous mixture can be used and some of the benefits of the present invention can be achieved, however, these larger amounts of water can lower the efficiency of the present invention because if the aqueous phase is discarded some yield loss occurs and if subjected to a separate recovery step handling of large volumes of material is required. In view of the foregoing, in most instances an aqueous mixture containing from about 8% to about 16% by weight solids is especially preferred.

After the aqueous mixture is prepared, the temperature of the mixture is adjusted to at least about 80° C. in order to achieve the subsequent reactions in a practical period of time. Mixture temperatures below about 80° C. result in excessive reaction times and can result in some yield loss due to incomplete reactions. Temperatures above 80° C. can be used, however, prolonged heating at temperatures at or above 100° C. will result in the vaporization of at least some of the water and some of the acid and thus produce undesired changes in the mixtures. In most instances it is preferred to adjust the temperature to about 85°–95° C. In most instances it will be necessary to heat the aqueous mixture to adjust the temperature to the desired range. Some heat is liberated in the subsequent acid addition step, however, the amount is not of a sufficient magnitude to materially change the temperature of aqueous mixture.

After the temperature is adjusted to the desired range, a sufficient amount of acid is added to maintain the pH of the aqueous mixture from about 3 to about 5. It is to be noted that since the dissolution of the rare earth oxides that is brought about, reaction with the acid is not instantaneous. Often the desired pH range can be obtained initially and then will rise as the reaction proceeds and the acid is consumed. It is necessary to add additional acid to maintain the pH within the desired range. Care should be taken to insure that the pH of the madium does not go below about 3 since any rare earth vanadates that can be present as contaminants will solubilize and reduce the brightness of the subsequently produced phosphor. Completion of the reaction and hence essentially complete dissolution of the rare earth oxides can be determined by the pH of the medium remaining relatively constant, within the 3 to 5 range after an amount of acid is added that is essentially equivalent to the theoretical amount of acid required to react with the rare earth oxides present in the impure material. At the higher pH range some of the rare earth oxide will not dissolve, therefore, it is preferred to us a pH range of from about 3.5 to about 4.5. It is to be noted that the preferred pH within the foregoing ranges will be dependent to some extent upon the particular rare earth oxide that is being recovered. For example, the preferred range for yttrium oxide is from about 3.5 to about 3.8, with gadolinium oxide the preferred range is from about 3.8 to about 4.2, while the preferred range for a $(Gd_{0.85}Y_{0.15})_2O_3$ mixed crystal phosphor is from about 3.5 to about 4.0. In most instances, therefore, a range of from about 3.5 to about 4.2 is especially preferred. The type of acids that will be used to adjust the pH of the aqueous mixture will be dependent upon the particular contaminants that are present in the impure material. For example, by the use of organic acids such as the lower aliphatic acids, sulfide phosphor contaminants will generally not react and can be removed during the subsequent solids removal step. Use of mineral acids such as nitric, sulfuric and the like result in the formation of soluble sulfide materials. These sulfide materials will remain in the liquid phase after the subsequent step wherein an insoluble oxidizable rare earth salt is formed. If phosphor is contaminated with a rare earth vanadate red-emitting phosphor, the vanadate portion remains insoluble by adjusting the pH to the range of between about 3 and about 5 and is removed during the subsequent filtration step.

After the pH remains constant, generally at least about 10 minutes, without the addition of acid, the solids are removed from the mixture, thereby forming a liquid phase that is relatively free from solids. Any conventional means for solid-liquid separation can be used such as filtration, settling, centrifugation and the like, however, filtration is preferred.

The rare earth values, after being dissolved in the medium, are precipitated as a water-insoluble thermally oxidizable rare earth salt. Although other materials can be used to react with the rare earth values to form the foregoing type of rare earth salt, it is preferred to use oxalic acid because of its availability and relatively low cost. By "thermally oxidizable rare earth salts" it is meant salts that will be converted to oxides upon the application of heat below a temperature of about 1600° F.

In a preferred embodiment at least a stoichiometric equivalent amount of oxalic acid, based upon the rare earth content and preferably a slight excess such as about 10% by weight, is added to the resulting liquid phase. Excess oxalic acid can be used, however, large amounts in excess of the theoretical stoichiometric amount required to convert all of the rare earth values present in the liquid phase are not preferred since no additional benefits are achieved and the cost of the process is thereby increased. The rare earth oxalates precipitate as solids and can be recovered as relatively pure materials by conventional separation means such as filtration. After recovering the water-insoluble oxidizable rare earth salts, the salts are dried and converted to rare earth oxide phosphors by conventional means, e.g., heating to above about 1500° F. for a time sufficient to convert the oxalates to oxides and thereafter firing at elevated temperatures as high as 2500° F. to form oxide phosphors.

To more fully illustrate some of the aspects of the invention, the following detailed examples are presented. All parts, proportions and percentages are by weight unless otherwise indicated.

EXAMPLE I

About 845 parts of europium-activated gadolinium-yttrium oxide phosphor contaminated with yttrium vanadate, zinc cadmium sulfide and zinc sulfide are heated to about 1000° F. for about 2 hours to drive off any moisture and other volatile material. About 550 parts of material are recovered after heating and are added to about 417 parts of water. The mixture is mixed and heated to about 85° C.

Sufficient parts of an aqueous solution of nitric acid (15.4 N) are added until the solution maintains a pH of from about 3.5 to about 4.0. (Equivalent to about 570 parts $HNO_3$—100% by weight basis.) The pH is maintained at about 3.5. After no change in pH is noted for about 10 minutes, without any acid additions, the solution is filtered to remove solids. The filtered solution is charged into the vessel and is heated to about 70° C. and an excess of a 30% aqueous oxalic acid solution is added. The solids are removed by filtration and washed with hot deionized water, dried at about 250° F. for about 16 hours, then heated to about 1500° F. for about 2 hours, then the temperature is raised to about 2300° F. and held for about 2 hours. The brightness of the resulting phosphor is essentially equivalent or brighter than a similar material $(Gd_{0.85}Y_{0.15})_2O_3$:Eu, made from virgin raw materials as measured by photomultiplier cell. In both phosphors the same ratios of rare earths (Gd, Y and E) are present.

Substantially similar results are achieved when similarly contaminated europium-activated yttrium oxide and europium-activated gadolinium oxide are reclaimed by the above process.

EXAMPLE II

A phosphor identical to that processed in Example I is slurried in a hot 10% aqueous sodium hydroxide solution and is allowed to digest for about 2 hours. The undissolved material is filtered and washed with water and dried for about 16 hours at 250° F. The resulting solid material is fired in a manner similar to the oxalates of Example I. The brightness of the resulting phosphor is only about 30% to 40% as bright as phosphors made from virgin raw materials.

While there have been shown and described what are at present considered the preferred embodiments of the invention, it will be obvious to those skilled in the art that various changes and modifications may be made therein

I claim:

1. A process suitable for recovering rare earth oxide phosphors from an impure material containing a rare earth oxide host material having a rare earth dopant material contaminated with other phosphors used in color television cathode ray tubes having a host material selected from the group consisting of yttrium vanadate, yttrium oxysulfide, zinc sulfide, zinc-cadmium sulfide and mixtures thereof, said process comprising:
    (a) heating said impure material to at least about 1000° F.;
    (b) forming an aqueous mixture containing from about 1% to about 25% by weight of solids derived from said impure material;
    (c) adjusting the temperature of said mixture to at least about 80° C.;
    (d) adding a sufficient amount of an acid to maintain the pH of the mixture at from about 3 to about 5 for a time sufficient to cause the dissolution of essentially all of the rare earth oxide;
    (e) separating solids from said mixture to thereby form a liquid phase relatively free of solids and containing rare earth values derived from the rare earth oxides;
    (f) precipitating said rare earth values from said liquid phase as water-insoluble thermally oxidizable rare earth salts;
    (g) heating said salts to convert said rare earth salts to a rare earth oxide host material having a rare earth dopant material.

2. A process according to claim 1 wherein said pH is adjusted between about 3.5 and 4.5.

3. A process according to claim 2 wherein said rare earths are selected from the group consisting of yttrium, gadolinium and mixtures thereof.

4. A process according to claim 1 wherein said water-insoluble thermally-oxidizable salt is a rare earth oxalate.

5. A process according to claim 1 wherein said temperature is from about 85° C. to about 95° C.

6. A process according to claim 1 wherein said aqueous mixture contains from about 8% to about 16% solids.

7. A process according to claim 6 wherein said rare earths are selected from the group consisting of yttrium, gadolinium and mixtures thereof.

8. A process according to claim 7 wherein said thermally-oxidizable salt is a rare earth oxalate.

9. A process according to claim 8 wherein said pH is from about 3.5 to about 4.2.

10. A process according to claim 9 wherein said temperature is from about 85° C. to about 95° C.

References Cited

UNITED STATES PATENTS

| | | | |
|---|---|---|---|
| 3,348,924 | 10/1967 | Levine et al. | 252—301.4 |
| 3,420,860 | 1/1969 | Ropp | 252—301.4 |
| 3,506,585 | 4/1970 | Otsuka et al. | 252—301.4R |

TOBIAS E. LEVOW, Primary Examiner

R. D. EDMONDS, Assistant Examiner